United States Patent Office 2,831,376
Patented Apr. 22, 1958

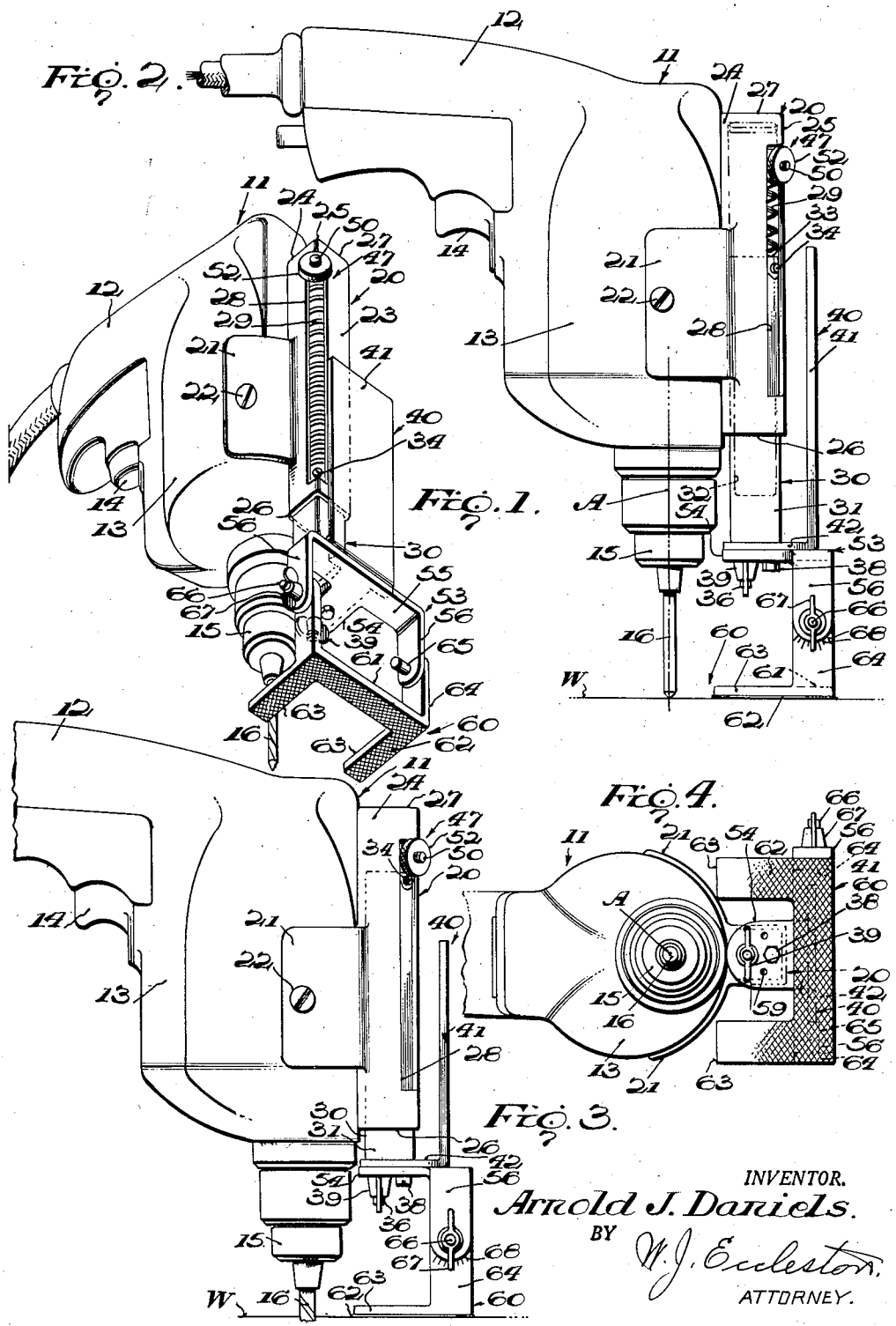

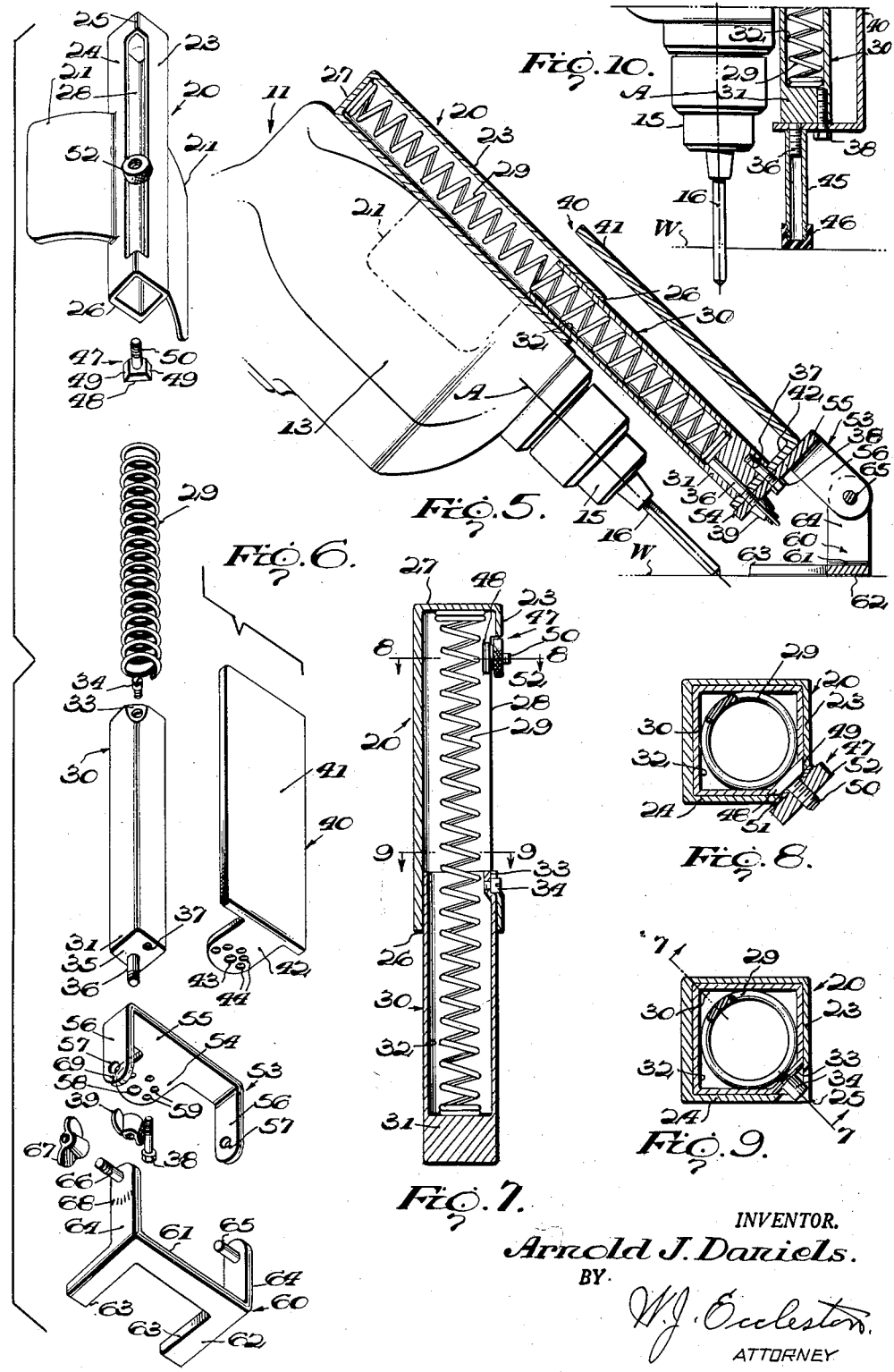

2,831,376

ATTACHMENT FOR PORTABLE POWER TOOL

Arnold J. Daniels, Wanamassa, N. J.

Application September 9, 1955, Serial No. 533,533

11 Claims. (Cl. 77—7)

(Granted under Title 35, U. S. Code (1952), sec. 266)

The invention described herein, if patented, may be manufactured and used by or for the Government for governmental purposes, without the payment to me of any royalty thereon.

The invention relates to attachments for portable power tools and is particularly applicable to attachment for electric drills. Such drills are widely used and are extremely versatile. However, the speed with which they operate makes it difficult to limit the depth of the hole when it is important not to drill entirely through the work piece or a hole of a given depth is required. Likewise, it is difficult to drill holes of uniform angularity when one or more holes must be drilled at a predetermined angle. Also, in use drill bits frequently break in such drills whereby flying pieces of the drill bit constitute a hazard to the user, particularly his face and eyes which are usually in proximity to the bit at all times. Thus, a face shield is desirable.

It is understood that others have attempted to solve the above objectionable features by the provision of depth gauges, angularity gauges, and face shields. However, it is believed that the invention is far superior to anything previously done along this line.

With the foregoing in view, it is an object of the invention to provide an improved drill attachment of the class described.

A further object is to provide an improved depth gauge for a power drill.

A further object is to provide an improved angularity gauge for a power drill.

A further object is to provide an improved combined depth and angularity gauge for a power drill.

A further object is to provide an improved face or eye shield for a power drill.

A further object is to provide improved means for mounting drill accessories on a power drill.

A further object is to provide improved means for mounting a face shield, a depth gauge, angularity gauge and/or a combined depth and angularity gauge on a power drill.

A further object is to provide an attachment for a power drill which includes improved adjustable means for adjusting a depth gauge to vary the depths of the holes drilled.

Other objects and advantages reside in the particular structure of the invention, the structure of the several elements thereof, combinations and subcombinations of said elements with each other and with a power drill, all of which will be readily apparent to those skilled in the art upon reference to the attached drawing in connection with the following specification wherein the invention is shown, described and claimed.

In the drawing:

Figure 1 is a perspective view of an electric drill showing the invention applied thereto;

Figure 2 is an elevational view of the same showing the position of the parts at the commencement of a vertical drilling operation;

Figure 3 is a like view but showing the position of the parts at the completion of the drilling operation;

Figure 4 is a bottom plan view of the same;

Figure 5 is an elevational view like Fig. 2 partly in longitudinal vertical section and showing the parts arranged for drilling a hole which is inclined from the vertical;

Figure 6 is an exploded perspective view of the main elements of the invention;

Figure 7 is a longitudinal, vertical sectional view through a subassembly of the invention and taken substantially on the plane of the line 7—7 of Fig. 9;

Figures 8 and 9 are slightly enlarged transverse, sectional views taken respectively substantially on the planes of the lines 8—8 and 9—9 of Fig. 7; and Figure 10 is a fragmentary view like Fig. 5 but showing a different accessory attached to the drill.

Referring specifically to the drawing, wherein like reference characters designate like parts in all views, 11 designates any suitable portable electric drill which includes the usual handgrip 12, motor mount 13, trigger switch 14, and chuck 15 which mounts a drill bit 16 on the drilling axis designated by the line A. As so far described, the drill is conventional and forms no part of the invention except as combined with the attachment now to be described.

In the embodiment illustrated, the attachment comprises a tubular housing 20 which is secured to the motor mount 13 in offset and substantially parallel relation to the drilling axis A by any suitable means such as the side flanges 21. The side flanges 21 are fixed to or integral with opposite sides of the housing 20 and are shaped to be complementary to the shape of the motor mount 13. They are secured to the mount 13 by welding or the like or by any suitable fasteners 22.

Housing 20 is non-circular in cross section and includes at least two converging sides 23, 24 which provide a longitudinal corner 25 extending between the open front end 26 and the closed rear end 27 of the housing. Intermediate the front and rear ends 26 and 27, the corner 25 is cut away to provide a closed and longitudinally extending slot 28. An expansive coil spring 29 is disposed in the housing 20 longitudinally thereof. One end of coil spring 29 bears on the closed rear end 27 of the housing and the other bears against a plunger 30. The plunger 30 is complementary in cross section to the interior of the housing 20 and is freely slidable therein through the open front end 26 thereof.

The plunger 30 may be formed with a solid front portion 31 and a rearwardly directed bore 32 receiving the front portion of spring 29 therein whereby to load the plunger for movement, axially forwardly out of housing 20. A rear corner portion of the plunger 30 may be flattened as at 33 and bored and tapped to receive a short threaded stop member such as set screw 34 which engages the front end of the slot 28 to prevent withdrawal of the plunger 30 from the housing 20 once it has been assembled therewith. The front face 35 of the plunger 30 is preferably flat and normal to the drilling axis A. A threaded stud 36 is fixed in the solid front portion 31 in any suitable manner and extends forwardly of front face 35 in parallel relation to the axis of the plunger. The solid front portion 31 of the plunger is formed also with an internally threaded socket 37 in offset parallel relation to the stud 36. A cap screw 38 is threaded in the socket 37 and a wingnut 39 is threaded on the stud 36 for purposes to be apparent hereinafter.

The stud 36, wingnut 39 and the socket and cap screw 37 and 38 comprise means for securing one or more drill accessories onto the front face 35 of the plunger 30. As best seen in Figure 6, one such accessory is a face or eye shield 40 which is preferably formed of tough transparent and shatterproof plastic material. The shield 40 comprises a shield body 41 of any suitable size or shape and which has a laterally directed ear or tab 42 integral with its forward edge. The ear 42 is formed with a central hole 43 which fits freely over the stud 36 and an arcuate series of holes 44 which are disposed to be successively registered with the socket 37 as the ear 42 is rotated about the stud 36 as an axis. The cap screw 38 extends through a selected hole 44 and is seated in socket 37 to secure the shield 40 in a selected angular position about the axis of the stud 36. The wingnut 39, of course, assists the cap screw 38 in clamping the shield ear 42 to the face 35 of the plunger 30. The fixed stud 36 and removable cap screw 38 is preferred to two fixed studs because an adjustment can be secured merely by loosening the wingnut after the cap screw is removed. The shield body 41, as illustrated, functions as an eye shield only when the drill is horizontal or at an angle to the vertical, Figure 5. Then, the shield body 41 is normally interposed between the eyes and the drill 16. When the tool is vertical, the shield body is not used because the eyes are shielded by the motor mount 13, housing 20 and ear 42 of the eyeshield. Where none of the other accessories are needed, the shield 40 may be the sole item mounted on the plunger 30. Usually, however, it will be used in connection with a depth gauge 45, Fig. 10 or with a combined depth and angularity gauge to be described later.

The depth gauge 45 is a device for gauging the depth of holes as they are drilled and in the embodiment illustrated comprises a tubular member having a soft tip 46 of rubber or the like on its front end for engaging the work W. The bore of the gauge 45 is tapped to fit the threads of the stud 36 and is substituted thereon for the wingnut 39. In operation, the plunger 30 is projected to its forward limit by the coil spring 29 at which point the rubber tip 46 preferably projects slightly beyond the free end of the drill bit 16. With the soft tip 46 engaging the work the drill is started and as it advances into the work W the gauge 45, shield 40 and plunger 30 are retracted as a unit against pressure of the coil spring 29 until the rear end of the plunger 30 engages the adjustable stop 47, now to be described, whereby further progress of the bit 16 into work W is prevented so that a hole of a selected depth is bored.

As best seen in Figures 6, 7, and 8, the adjustable stop 47 comprises an adjustable stop member 48 which includes converging edge portions 49 which wedgingly engage the inner surfaces of the converging housing walls 34 and 24 on either side of the slot 28. As clearly seen in Fig. 8, the stop member 48 is flat enough to slide freely in the triangular space between the coil spring 29 and the corner 25. Any suitable guide member, which may comprise a threaded stud 50 is fixed to or is integral with the stop member 48 and extends radially outwardly of the housing 20 through the slot 28. The stop member 48 is clamped into wedging engagement with side walls 23 and 24 by any suitable means such as the washer 51 and the nut 52 in a well known manner.

Whenever the angularity of the hole to be drilled is critical, it will be desirable to substitute the combined depth and angularity gauge now to be described for the depth gauge 45 aforesaid.

This combined gauge comprises a bracket 53 which is T-shaped in plan and includes a leg 54 and a runner 55. The outer ends of the runner 55 are forwardly directed to provide laterally spaced parallel ears 56 formed with aligned holes 57. The leg 54 is formed with a hole 58 for the stud 36 and an arcuate series of holes 59 disposed concentrically of hole 58 for the cap screw 38. The holes 58 and 59 correspond in location to the holes 43 and 44 of the face shield ear 42 and they are for the same purpose.

The bracket 53 is pivotally-adjustably mounted on a base 60 which comprises a web 61 having an outer work-engaging surface ply 62 of soft non-slip material. The base web preferably includes a pair of laterally extending feet 63 which straddle the drill bit 16 as well as a pair of upwardly extending parallel ears 64 having coaxial unidirectionally extending stub shafts 65 and 66 thereon. The stub shaft 65 is unthreaded and freely fits into the hole 57 of one of the bracket ears 56 from the outside. The other stub shaft 66 has a threaded end and fits into the hole 57 of the other bracket ear 56 from the inside thereof as best seen in Figure 1. A wingnut 67 is threaded on the stub shaft 66 and clamps the ears 64 of the base to ears 56 of the bracket in a manner readily understood. To determine the angular relation of the drilling axis A to the work W, a scale 68 is formed on one of the ears 64 of the base 60 and an index or zero mark 69 is formed on the corresponding ear 56 of the bracket 53. Preferably and as shown, the scale 68 and index mark 69 will be located around the threaded stub shaft 66 so that a selected adjustment can be maintained while tightening the wingnut 67.

It is obvious that this combined gauge may be set for depth in the same manner as is the depth gauge 45 of Figure 10. Likewise, it is understood that the face or eye shield may be used with the combined gauge as shown or it may be omitted.

While there has been shown and described what is now thought to be the preferred embodiment of the invention, it should be understood that the same is susceptible of other forms and expressions. Consequently, the invention should not be considered as being limited to the precise structures shown and described hereinabove except as hereinafter claimed.

I claim:

1. In a portable power drill including a motor mount, a drilling axis, and a drill bit mounted on said tool along said axis the combination with such motor mount; of a tubular housing fixed to said mount in offset and substantially parallel relation to said drilling axis, said housing being non-circular in cross section, a plunger shaped to be complementary to said housing and slidably received therein, a coil spring in said housing in driving engagement with said plunger and resisting sliding movement of said plunger axially inwardly of said housing, an adjustable stop adjustable longitudinally of said housing and engageable with said plunger to limit the sliding of the latter into said housing, said housing including forward and rear ends and at least two converging walls providing a corner, said corner being formed to provide a longitudinally extending, closed slot between said ends, said spring being circular in cross section to provide a space between the periphery thereof and said slot, said adjustable stop comprising a stop member slidable longitudinally of said housing in said space in said corner between said spring and said slot, a guide means fixed to said stop member and extending outwardly through said slot, clamping means engaging said guide means to clamp said stop member in selected positions along said slot, a T-shaped bracket including a leg and a runner, said plunger having a free outer end, means for readily detachably securing said free outer end to said leg of said bracket at right angles thereto, said runner having outer ends including downwardly directed tips providing ears, a base including a work engaging web and a pair of upwardly directed spaced parallel ears, and means pivotally and angularly adjustably securing said ears of said base to said ears of said bracket to provide a combined depth and angularity gauge for said drill bit.

2. A device according to claim 1, wherein said stop member includes converging sides wedgingly engaging said converging side walls of said housing interiorly thereof on opposite sides of said slot.

3. The combination with a portable power drill including a motor mount, a drilling axis, and a drill mounted on said tool along said axis; of a tubular housing fixed to said motor mount in offset and substantially parallel relation to said drilling axis, said housing including front and rear ends and at least two converging side walls providing a longitudinally extending corner, said corner being formed to provide a closed slot between said ends, said spring being circular in cross section to provide a space between the periphery thereof and said slot, a plunger shaped to be complementary to said housing and slidable therein, a coil spring in said housing between said rear end thereof and said plunger and resisting sliding movement of the latter axially inwardly of said housing, said plunger having a front end located outwardly of said housing, an adjustable stop member slidable longitudinally of said housing in said space in said corner between said spring and said slot, a guide member fixed to said stop member and extending outwardly of said housing through said slot, clamping means engaging said guide member to clamp said stop member to said housing in selected positions along said slot, said plunger having a rear end engageable with said stop member to limit sliding movement of said plunger axially inwardly of said housing and means for readily detachably connecting at least one drilling accessory to said front end of said plunger.

4. A device according to claim 3, wherein said stop member is shaped for a wedging engagement with said converging side walls of said housing interiorly thereof.

5. A device according to claim 3, wherein said accessory comprises a transparent eye shield and a work engaging depth gauge.

6. A device according to claim 3, wherein said accessory comprises a transparent eye shield and a work engaging combined depth and angularity gauge.

7. A device according to claim 3, wherein said accessory comprises a work engaging combined depth and angularity gauge.

8. In a drill having a drilling axis and a drill bit mounted therealong, a combined depth and angularity gauge for said drill, comprising a tubular housing, means for attaching said housing to said drill in offset and substantially parallel relation to said drilling axis of said drill, said housing including front and rear ends and at least two converging side walls providing a longitudinally extending corner, said corner being formed to provide a closed slot between said ends, a plunger shaped to be complementary to said housing and slidable therein, a coil spring in said housing between said rear end thereof and said plunger and resisting sliding movement of the latter axially inwardly of said housing, said spring being circular in cross section to provide a space between the periphery thereof and said slot, said plunger having a front end located outwardly of said housing, an adjustable stop member slidable longitudinally of said housing in said space in said corner between said spring and said slot, a guide member fixed to said stop member and extending outwardly of said housing through said slot, clamping means engaging said guide member to clamp said stop member to said housing in selected positions along said slot, and a work engaging depth and angularity gauge for said drill bit on said front end of said plunger.

9. An attachment according to claim 8, wherein said gauge comprises a T-shaped bracket including a leg and a runner, means securing said leg of said bracket across said front end of said plunger at right angles thereto, said runner having outer ends having forwardly directed tips providing spaced and parallel ears, a base including a work engaging web and a pair of laterally spaced and parallel rearwardly directed ears, and means pivotally and angularly adjustably securing said ears of said base to said ears of said bracket.

10. An attachment according to claim 9, wherein said means securing said leg of said bracket to said front end of said plunger comprises a stud on said front end of said plunger, said leg being formed with a hole rotatably receiving said stud, nut means engageable with said stud for clamping said leg to said front end of said plunger, said front end of said plunger being formed with an internally threaded socket in offset parallel relation to said stud, said bracket leg being formed with an arcuate series of holes concentrically of said first named holes and selectively registerable with said hole in said plunger, and a clamping cap screw extensible through a selected one of said series of holes and threadedly seatable in said hole in said plunger to clamp said bracket in a selected position about the axis of said stud.

11. An attachment according to claim 8, wherein said gauge comprises a T-shaped bracket including a leg and a runner, means securing said leg of said bracket across said front end of said plunger at right angles thereto, said runner having outer ends having forwardly directed tips providing spaced and parallel ears, a base including a work engaging web and a pair of laterally spaced and parallel rearwardly directed ears, one pair of ears being formed with coaxial circular holes therethrough, the other pair of ears mounting a pair of unidirectional coaxial horizontal stub shafts pivotally engaged in said holes to pivotally connect said bracket and base together, and lock means operatively associated with at least one of said shafts and associated ears for locking said bracket and base together in selected pivotally adjusted relation.

References Cited in the file of this patent

UNITED STATES PATENTS

| 400,033 | Alliger | Mar. 26, 1889 |
| 2,160,274 | Lopiz | May 30, 1939 |
| 2,165,334 | Bossi | July 11, 1939 |

U. S. DEPARTMENT OF COMMERCE
PATENT OFFICE

CERTIFICATE OF CORRECTION

Patent No. 2,831,376  Arnold J. Daniels  April 22, 1958

It is hereby certified that error appears in the printed specification of the above numbered patent requiring correction and that the said Letters Patent should read as corrected below.

Column 4, line 36, after "axis" insert a comma; line 49, after "extending" strike out the comma; column 5, lines 4 to 6, strike out "said spring being circular in cross section to provide a space between the periphery thereof and said slot," and insert the same in line 10, after the word and comma "housing," column 6, line 25, for "holes", second occurrence, read -- hole --; lines 26 and 28, for "hole" read -- socket --.

Signed and sealed this 10th day of June 1958.

(SEAL)
Attest:
KARL H. AXLINE
Attesting Officer

ROBERT C. WATSON
Commissioner of Patents